(12) United States Patent
Diamond et al.

(10) Patent No.: US 12,034,302 B2
(45) Date of Patent: Jul. 9, 2024

(54) HIERARCHICAL CONTROL SYSTEM FOR OPTIMAL MANAGEMENT OF ENERGY RESOURCES

(71) Applicant: Doosan GridTech, Inc., Seattle, WA (US)

(72) Inventors: Nate Diamond, Seattle, WA (US); Sam Skrivan, Seattle, WA (US); Jacob Hansen, Dover, NH (US); Krysta Suzanne Yousoufian, Lake Forest Park, WA (US); Paydon Wilinchery, Seattle, WA (US)

(73) Assignee: Doosan GridTech, Inc., Bellevue, WA (US)

( * ) Notice: Subject to any disclaimer, the term of this patent is extended or adjusted under 35 U.S.C. 154(b) by 0 days.

(21) Appl. No.: 17/671,355

(22) Filed: Feb. 14, 2022

(65) Prior Publication Data

US 2022/0416545 A1 Dec. 29, 2022

Related U.S. Application Data

(60) Provisional application No. 63/148,912, filed on Feb. 12, 2021.

(51) Int. Cl.
*H02J 3/32* (2006.01)
*G05B 15/02* (2006.01)
(Continued)

(52) U.S. Cl.
CPC ............... *H02J 3/32* (2013.01); *G05B 15/02* (2013.01); *G06Q 50/06* (2013.01); *H02J 7/0048* (2020.01);
(Continued)

(58) Field of Classification Search
None
See application file for complete search history.

(56) References Cited

U.S. PATENT DOCUMENTS

| | | | |
|---|---|---|---|
| 2005/0024015 A1* | 2/2005 | Houldsworth | H02J 7/0014 320/119 |
| 2009/0189456 A1* | 7/2009 | Skutt | H02J 3/46 307/87 |

(Continued)

OTHER PUBLICATIONS

Dudiak et al., "Hierarchical control of microgrid with renewable energy sources and energy storage", Sep. 2015, The Eight Intl. Scientific Symposium. (Year: 2015).*

(Continued)

*Primary Examiner* — Mohammad Ali
*Assistant Examiner* — Kelvin Booker
(74) *Attorney, Agent, or Firm* — Shook, Hardy & Bacon L.L.P.

(57) ABSTRACT

Methods and systems are provided for optimizing energy management of an energy resource site. For instance, a hierarchical energy management system can provide optimized management of energy resource sites with large numbers of energy resources. In particular, the hierarchical energy management system can effectively control energy resources by allocating functionality using different tiers. For instance, one or more energy resources devices can comprise the lowest tier of the hierarchical energy management system. The next tier of the hierarchical energy management system can comprise one or more controllers that can manage the energy resource devices. The next tier of the hierarchical energy management system, a resource manager, generally manages the set of controllers.

20 Claims, 7 Drawing Sheets

(51) Int. Cl.
   *G06Q 50/06*   (2024.01)
   *H02J 7/00*    (2006.01)
   *H02J 13/00*   (2006.01)

(52) U.S. Cl.
   CPC ...... *H02J 7/0071* (2020.01); *H02J 13/00028* (2020.01); *G05B 2219/2639* (2013.01); *H02J 2203/10* (2020.01); *H02J 2310/58* (2020.01)

(56) References Cited

U.S. PATENT DOCUMENTS

| | | | |
|---|---|---|---|
| 2009/0200988 A1 | 8/2009 | Bridges et al. | |
| 2011/0047052 A1* | 2/2011 | Cornish | G06Q 40/12 705/37 |
| 2011/0064981 A1* | 3/2011 | Scheucher | B60L 15/20 429/99 |
| 2012/0175966 A1* | 7/2012 | Nakashima | H02J 7/0019 307/86 |
| 2013/0024042 A1* | 1/2013 | Asghari | H02J 9/00 700/295 |
| 2013/0096727 A1* | 4/2013 | Brandt | G05B 19/4186 700/291 |
| 2013/0110300 A1* | 5/2013 | Sinsabaugh | H02J 3/003 700/286 |
| 2013/0260191 A1 | 10/2013 | Takahashi et al. | |
| 2014/0077596 A1* | 3/2014 | Nishibayashi | H02J 3/38 307/29 |
| 2014/0188689 A1 | 7/2014 | Kalsi et al. | |
| 2014/0288719 A1* | 9/2014 | Kanayama | H02J 3/381 700/286 |
| 2015/0032301 A1* | 1/2015 | Lamba | B60L 58/20 701/19 |
| 2017/0149247 A1 | 5/2017 | Sowder et al. | |
| 2018/0149703 A1* | 5/2018 | Tohara | H02J 7/0068 |
| 2018/0316222 A1* | 11/2018 | Shim | H02J 13/00002 |
| 2021/0021126 A1* | 1/2021 | Hall | G06F 1/263 |
| 2022/0200314 A1 | 6/2022 | Zhou et al. | |
| 2022/0263317 A1* | 8/2022 | Diamond | G06Q 50/06 |

OTHER PUBLICATIONS

Choudar et al., "A local energy management of a hybrid PV-storage based distributed generation for microgrids", Aug. 2014, Energy Conversion and Management 90 (2015) 21-33. (Year: 2014).*
Chang et al., "Coordinated Frequency and State-of-Charge Control with Multi-Battery Energy Storage Systems and Diesel Generators in an Isolated Microgrid", Apr. 2019, Energies 2019, 12, 1614. (Year: 2019).*
Hu et al., "Transactive control: a framework for operating power systems characterized by high penetration of distributed energy resources", Jan. 2016, J. Mod. Power Syst. Clean Energy (2017) 5(3):451-464. (Year: 2016).*
Feng, X., et al., "Comparison of Hierarchical Control and Distributed Control for Microgrid", Electric Power Components and Systems, vol. 45, No. 10, pp. 1043-1056 (2017).
Wu, D., et al., "Hierarchical Control Framework for Integrated Coordination between Distributed Energy Resources and Demand Response", Electric Power Systems Research, pp. 1-27 (May 1, 2017).
International Search Report and Written Opinion received for PCT Patent Application No. PCT/US2022/016179, mailed on May 17, 2022, 13 pages.
Non-Final Office Action dated Dec. 12, 2022 in U.S. Appl. No. 17/671,126, 12 pages.
International Preliminary Report on Patentability received for PCT Patent Application No. PCT/US2022/016179, mailed on Aug. 24, 2023, 12 pages.

* cited by examiner

HIERARCHICAL CONTROL SYSTEM FOR OPTIMAL MANAGEMENT OF ENERGY RESOURCES

CROSS-REFERENCE TO RELATED APPLICATIONS

This application claims the benefit of U.S. Provisional Application No. 63/148,912 filed Feb. 12, 2021, the entire contents of which is herein incorporated by reference in its entirety.

BACKGROUND

Energy management systems are typically used to manage energy resources. For instance, energy management systems can be used to control various energy storage resources to meet the needs of an electrical grid and its operators. Managing electric energy storage can mitigate supply-demand imbalances, for example by storing electric energy during periods of excess supply and returning energy to an electric power grid during periods of excess demand. Accordingly, an energy management system can manage the energy resources to meet the needs of an electrical grid and its operators.

SUMMARY

Embodiments of the present disclosure are directed towards hierarchical energy management system that can provide optimized management of energy resource sites with large numbers of energy resources. In accordance with embodiments of the present disclosure, the system effectively controls energy resources by allocating functionality using different tiers. In particular, a resource manager is configured to manage a set of controllers, and each controller is configured to control various energy resource devices. Instead of allocating power over the state-of-charge of individual energy storage devices, the resource manager can allocate power in accordance with an average of the state-of-charge of the aggregations of energy storage devices associated with a corresponding controller. Such a hierarchical implementation enables efficient management of an extensive amount of energy resource devices.

BRIEF DESCRIPTION OF THE SEVERAL VIEWS OF THE DRAWING

These and other features, aspects, and advantages of the present disclosure are better understood when the following Detailed Description is read with reference to the accompanying drawings.

DETAILED DESCRIPTION OF THE INVENTION

Figure 1:
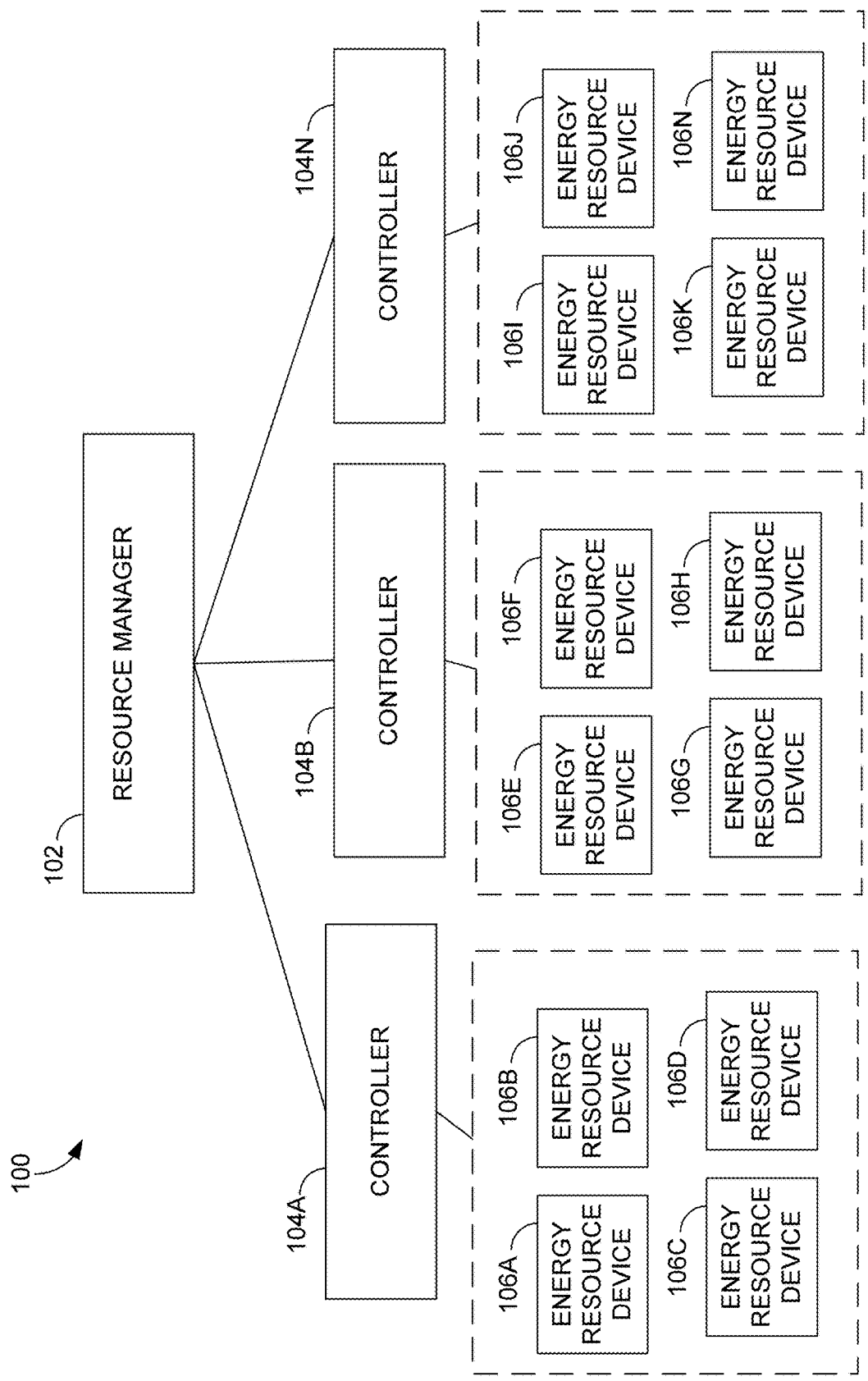
FIG. 1 depicts an example configuration of an operating environment in which some implementations of the present disclosure can be employed, in accordance with various embodiments.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Oftentimes, energy management systems can be used to control various energy resources to meet the needs of an electrical grid and its operators. In this regard, energy storage systems are connected to an external electric power grid to provide the grid with energy storage capabilities. In particular, electric energy storage can mitigate supply-demand imbalances by storing electric energy during periods of excess supply and returning it to the electric power grid during periods of excess demand. Electric energy storage can provide various benefits for utilities and other grid operators, including firming of wind and solar power to address the intermittency of these power sources, improving reliability, outage backup, volt/VAR control, frequency regulation and system upgrade deferral.

As the desire for using electric energy storage increases, energy resource sites are being deployed that are on an order of magnitude larger than previous energy resource sites. For example, energy resource sites are growing to accommodate an extensive number of energy storage devices (e.g., batteries) for storing energy. As such, managing each of the energy storage devices is becoming increasingly time and resource intensive. In particular, as conventional energy management systems typically only control a relatively small number of energy resources, it is becoming more difficult to effectively manage the vast number of energy resources being deployed at an energy resource site.

Accordingly, embodiments of the present disclosure are directed to a hierarchical energy management system that allows for optimized management of energy resource sites with large numbers of energy resources. In particular, the hierarchical energy management system can effectively control energy resources by allocating functionality using different tiers. For instance, one or more energy resources devices can be managed via a hierarchical energy management implementation.

In operation, a resource manager can manage a set of controllers, which in turn each control a set of energy resource devices. The resource manager can control allocation and apportionment of power for each of the energy resource devices in the system via the corresponding controllers. In particular, the resource manager can transmit instructions to the set of controllers that indicate an allocation of power to apply to the aggregation of devices related to a particular controller (e.g., the aggregation of devices that a controller controls). Such an allocation and apportionment of power can be designated based on an average of the state of charge between an aggregations of devices (e.g., managed by a particular controller). As such, instead of working over the state-of-charge of individual energy resource devices to identify power allocation, the resource manager can work over an average of the state-of-charge between the aggregations of energy resource devices (e.g., managed by the controllers).

In determining power allocation, the resource manager can do so in association with an operating mode(s), such as an operating mode selected by a user. Advantageously, the power allocation may be determined in light of a segmented implementation of modes (e.g., application of an operating mode to a portion of the system instead of to the entire system). For example, one set of operating modes can be used for a defined percentage of the system, and another set of operating modes can be used on another defined percentage of the system. This segmentation of operating modes can be based on a predetermined configuration of energy resource devices at an energy resource site. For example, segmentation can be based on the physical layout of the site. As another example, segmentation can be based on a virtual division of the site.

The controllers, in communication with the resource manager, are configured to manage a corresponding set of energy resources devices. In embodiments, the controllers may analyze constraints (e.g., a level of power that cannot be exceeded) and use such constraints to manage the energy resource devices. Such constraints can be based on energy resource device limitations.

In controlling various energy resource devices, a controller may manage the charging and/or discharging of the energy resource devices such that the energy resource devices operate in accordance with a power allocation determined by the resource manager. As such, each controller is executed to manage a particular portion of energy resource devices at an energy resource site, as opposed to a single controller managing all the energy resource devices at the site. In this way, the hierarchical energy management system increases scalability of energy resources that can be optimally managed at a site (e.g., by allowing any number of energy resource devices to be deployed at a site).

Turning to FIG. 1, FIG. 1 depicts an example configuration of an operating environment in which some implementations can be employed, in accordance with various embodiments of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 7.

It should be understood that operating environment 100 shown in FIG. 1 is an example of one suitable operating environment. Among other components not shown, operating environment 100 includes a resource manager 102, a set of controllers 104 (e.g., controllers 104A and 104B through 104N), and a set of energy resource devices 104 (e.g., energy resource devices 106A and 106B through 106N). Such components shown in FIG. 1 may be implemented via any type of computing device, such as one or more of computing device 700 described in connection to FIG. 7, for example. It should be understood that any number of devices, servers, and other components may be employed within operating environment 100 within the scope of the present disclosure. Each may comprise a single device or multiple devices cooperating in a distributed environment.

Generally, the hierarchical energy management system 100 is generally configured to manage energy resource devices in a hierarchical manner. In this regard, the hierarchical energy management system 100 can distribute operations being executed to effectively and efficiently manage or control numerous energy resource devices operating at a site or multiple sites. In particular, the hierarchical energy management system 100 can implement a resource manager 102 to manage a set of controllers 104, including controller 104A and 104B through 104N. In turn, a single controller, such as controller 104A, can then be used to manage an aggregation of energy resource devices 106. As can be appreciated, the resource manager 102 effectively manages or controls various energy resource devices (e.g., energy resource devices 106A-106N) via multiple controllers (e.g., 104A-104N).

As a non-limiting example, the resource manager 102 can be used to control 150 different energy resource devices. These 150 energy resource devices can be divided into groups that can be managed as a conglomerate by a particular controller. For example, the 150 energy resource devices can be divided into 10 groups, such that 10 different controllers each manage 15 energy resource devices. For instance, a controller can execute instructions (e.g., based on an allocation and/or scheduling command received from the resource manager) such that the 15 energy resource devices it controls follow functionality as indicated by the resource manager. In this way, the resource manager can communicate with the 10 controllers, with each of the 10 controllers in turn communicating with the corresponding 15 energy resource devices. Such a hierarchical implementation enables efficient control of an extensive number of energy resource devices.

As described, the resource manager 102 generally manages energy resource devices via various controllers, such as a set of controllers 104A-104N. For instance, the resource manager 102 can be used to control allocation of power, or energy, in association with a set of controllers that control an aggregation of energy resource devices. In particular, the resource manager 102 can transmit instructions to controllers 104 that indicate an allocation of power to apply to the aggregation of energy resource devices related to the corresponding controllers. Such an allocation of power can be determined by the resource manager 102 based on an average of the state-of-charge between an aggregation of energy resource devices (e.g., managed by a particular controller).

Each controller 104 generally communicates with the resource manager 102 and a set of energy resource devices, at least some of which the controller 104 controls. For example, controller 104A communicates with resource manager 102 and energy resource device 106A, 106B, 106C, and 106D. At a high level, each controller 104 may communicate with the corresponding set of energy resource devices to enable selection, installation, removal, exchange, maintenance, monitoring, control, charging, or discharging associated with energy resource devices (e.g., energy storage devices and/or power conversion devices). In this regard, a controller 104 may enable performance optimization by controlling or triggering differential charging or discharging of individual energy resource devices. For example, a controller may trigger charging or discharging of energy storage devices during times of excess power generation, peak demand, load-following, smoothing intermittent generation, supplying ancillary services (e.g., frequency regulation), supplying power in an event of an outage, etc. As described herein, the controller may generate and/or provide a command to an appropriate energy resource device (e.g., energy storage device and/or power conversion device) to flow current at a given level to and/or from an external electric power grid.

To enable performance optimization, the controller 104 can monitor various metrics of interest associated with energy resource devices (e.g., energy storage devices and/or power conversion devices) thereby enabling differential charging or discharging of individual energy storage devices to optimize overall performance. For example, a controller may monitor energy resource devices (e.g., energy storage devices and/or power conversion devices) to monitor state-of-charge (SOC), cycle life, calendar life, voltage (e.g., maximum voltage, minimum voltage), current (e.g., maximum current, minimum current), power, charge profile, discharge profile, maximum charge rate, maximum discharge rate, total energy capacity, and/or temperature to optimize overall performance by controlling differential charging or discharging of individual devices. To this end, the controller 104 may collect data via the various energy resource devices, or components associated therewith (e.g., voltage and current sensors), on the performance and operation of the various energy resources devices. Such data may be analyzed by the controller 104 and/or communicated to the resource manager 102 for analysis of the data. The controller 104 and/or resource manager 102 can utilize the collected data to optimize performance based at least in part on a power or energy supply or demand (e.g., of an external system).

The energy resource devices 106 generally operate to facilitate utilization of an energy resource. In this regard, an energy resource device, as used herein, generally refers to a device associated with an energy resource (e.g., battery, solar, wind, etc.). In embodiments, such energy resources devices can be used to store and/or convert energy. An energy resource device can be any of a number of devices. By way of example, and not limitation, an energy resource device may be or include an energy storage device, a battery, a meter, a relay, a battery container, a gas controller, an HVAC, a generator, a power conversion device (e.g., inverter or converter), any combination of these devices (e.g., an energy storage unit), or any other suitable device associated with energy resources. Energy resource devices with which a controller communicates may be devices associated with the electrical power grid (e.g., meters, relays, etc.).

In some cases, an energy resource device can include an energy storage device(s) and a power conversion device(s). An energy resource device including an energy storage device and a power conversion device is generally referred to herein as an energy storage unit (ESU). An energy storage device generally stores energy. One example of an energy storage device is a battery, which may be constructed from a wide variety of battery cell types and chemistries, including lithium-ion, nickel-cadmium, nickel-metal-hydride, lead-acid, zinc-air, and other currently available and emerging technologies. Energy storage devices may be of one or more types and sizes, provided by one or more suppliers, and may have different electrical and/or physical characteristics (e.g., energy capacity, power capacity, current capacity, voltage, etc.). A power conversion device refers to a device that converts power (e.g., AC-DC or DC-AC). Generally, power conversion devices are configured to convert an electrical parameter of power transferred to and from the energy storage devices. For instance, a power conversion device can convert a battery's DC output to AC for the grid. By way of example, a power conversion device may convert AC power to DC power to charge energy storage devices from an external source, such as an electric power grid, and/or convert DC power to AC power to discharge energy storage units to an external source, such as an electric power grid. A power conversion device may be or include an inverter or a converter. Power conversion devices may be of one or more types and sizes, provided by one or more suppliers, and may have different electrical and/or physical characteristics.

Figure 3:
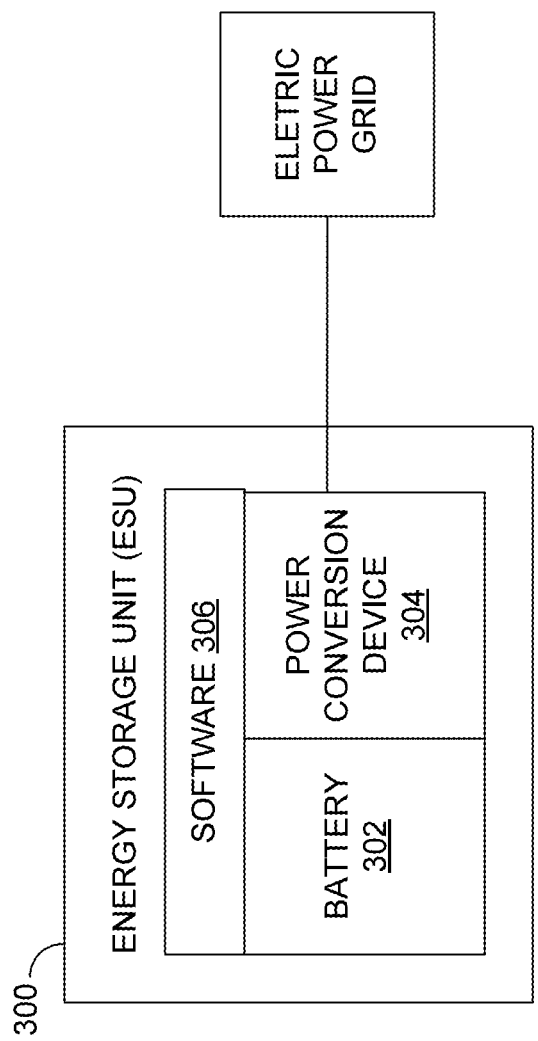
FIG. 3 depicts an example configuration of an energy storage unit, in accordance with various embodiments of the present disclosure.

One example of an ESU is illustrated in FIG. 3. As shown in FIG. 3, an energy storage unit (ESU) 300 includes a battery 302, a power conversion device 304, and software 306. The software 306 can be used to manage and control the battery 302 and the power conversion device 304. As shown, the ESU 302 communicates with the electric power grid.

In embodiments, an energy resource device may include software to control the device. In this regard, the energy resource devices can include one or more processors, and one or more computer-readable media. The computer-readable media may include computer-readable instructions executable by the one or more processors. The instructions may be embodied by one or more applications. In the case an energy resource device includes an energy storage device (e.g., battery) and a power conversion device, both the energy storage device and the power conversion device may include its own embedded software. Various interfaces may be used to communicate between devices, such as devices built by different companies. As such, a controller may communicate with energy storage devices (e.g., batteries) and power conversion devices provided by different vendors.

As illustrated, the hierarchical energy management system 100 is coupled to an electric power grid 108. For example, the hierarchical energy management system 100 may connect to a power grid via an energy resource device, such as a power conversion device. The hierarchical energy management system 100 may connect to a power distribution grid 108 to provide the grid with energy storage capabilities. In particular, energy storage (e.g., electric energy storage) offers benefits to an electric power grid, that is, for utilities and other grid operators to address the intermittency of various power sources (e.g., wind and solar power). Energy storage can also improve reliability, outage backup, volt/VAR control, frequency regulation and system upgrade deferral, among other things. The electric power grid 108 generally delivers or distributes electricity. That is, an electrical grid includes an interconnected network for delivering electricity from producers to consumers. In embodiments, electric power grid 108 is operated by an electric utility.

In some embodiments, the hierarchical energy management system 100 facilitates energy management associated with energy resource devices at a particular or single site (e.g., a particular location in connection with an electrical power grid). In other embodiments, the hierarchical energy management system 100 can facilitate energy management associated with multiple energy resource sites, each site having a set of energy resource devices 106. In this regard, the sites are positioned at different locations along an electrical power grid.

As such, it should be appreciated that hierarchical energy management system 100 may be provided via multiple devices arranged in a distributed environment that collectively provide the functionality described herein. Additionally, other components not shown may also be included within the distributed environment.

Figure 2:
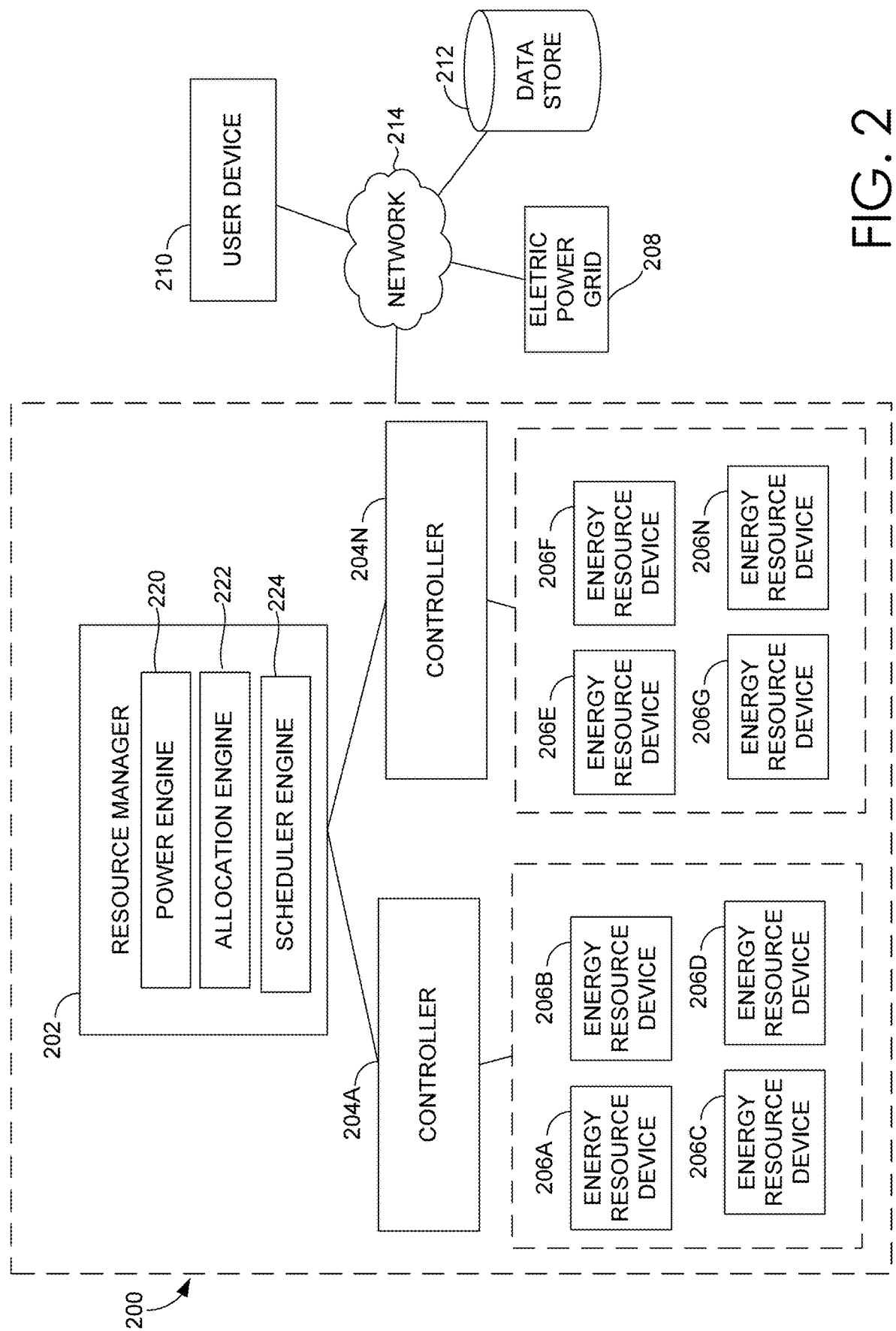
FIG. 2 depicts a further example configuration of an operating environment in which some implementations of the present disclosure can be employed, in accordance with various embodiments of the present disclosure.

Referring to FIG. 2, aspects of an illustrative energy management environment are shown, in accordance with various embodiments of the present disclosure. As shown in FIG. 2, an energy management environment includes a hierarchical energy management system 200, an electric power grid 208, user device 210, and a data store 212.

In embodiments, the hierarchical management system 200, the electric power grid 208, user device 210, and data store 212 may communicate via network 214, which may be wired, wireless, or both. A network can include multiple networks, or a network of networks, but is shown in simple form so as not to obscure aspects of the present disclosure. By way of example, a network can include one or more wide area networks (WANs), one or more local area networks (LANs), one or more public networks such as the Internet, and/or one or more private networks. Where a network includes a wireless telecommunications network, components such as a base station, a communications tower, or even access points (as well as other components) may provide wireless connectivity. Networking environments are commonplace in offices, enterprise-wide computer networks, intranets, and the Internet. The network may be any network that enables communication among machines, databases, and devices (mobile or otherwise). Accordingly, the network may be a wired network, a wireless network (e.g., a mobile or cellular network), a storage area network (SAN), or any suitable combination thereof. In an example embodiment, the network includes one or more portions of a private network, a public network (e.g., the Internet), or combination thereof.

The hierarchical energy management system 200 can work in conjunction with any number of data stores 212. For example, each component or device may include or have access to a data store. A data store 212 can store computer instructions (e.g., software program instructions, routines, or services), data, and/or models used in embodiments described herein. In some implementations, data store 212 can store information or data received via the various components or devices of hierarchical energy management system 200 and provides the various devices and/or components with access to that information or data, as needed. Further, the information in data store 212 may be distributed in any suitable manner across one or more data stores for storage (which may be hosted externally). In embodiments, data store 212 can be used to store information related to energy management. As one example, such information can include information indicative of a system goal for an energy resource site comprising energy resources. As another example, such information stored in a data store 212 may include data collected from energy resource devices, such as, for example, state-of-charge (SOC), cycle life, calendar life, voltage (e.g., maximum voltage, minimum voltage), current (e.g., maximum current, minimum current), power, charge profile, discharge profile, maximum charge rate, maximum discharge rate, total energy capacity, temperature, etc. As yet other examples, data store 212 may store operating modes, constraints, schedules, and/or the like.

The user device 210 may include an application utilized by a user to interface with the functionality implemented via a hierarchical energy management system 200. An application(s) included on user device 210 may generally be any application capable of facilitating the exchange of information between the user device and the hierarchical energy management system 200 in carrying out energy management related to energy resource devices. In some implementations, the application(s) comprises a web application, which can run in a web browser, and could be hosted at least partially on a server. In addition, or instead, the application(s) can comprise a dedicated application, such as an application having energy management functionality. In some cases, the application is integrated into the operating system (e.g., as a service).

In particular, the user device 210 can be used (e.g., by a user) to input or identify goals (e.g., via operating modes) related to energy management associated with a set of energy resources, or devices associated therewith. For example, a user can input one or more operating modes that relate to a system goal for a site. In addition, in some embodiments, a user may input or identify constraints related to one or more energy resource devices. For instance, constraints can be based on a defined power limit due to device limitations. Other information can also be input via the user device, such as, for example, a predetermined configuration of energy resource devices at the energy resource site. For instance, in some embodiments, a predetermined configuration of which energy resource devices correspond with which controllers can be based on a physical layout of the energy resource site. In other embodiments, a predetermined configuration of which energy resource devices correspond with which controllers can be based on a virtual division of the energy resource site related to a defined percentage of the set of energy resource. In addition to inputting information via the user device 210, the user device 210 can also present information or data related to energy management.

As depicted, hierarchical energy management system 200 includes energy resource manager 202, controllers 204A-204N, and energy resource devices 206A-206N. Any number of devices or components may be used to implement functionality described herein. Although the energy resource devices 206 are generally illustrated in connection with the hierarchical energy management system 200, energy resource devices 206 may additionally or alternatively corresponding with a grid, such as an electrical power grid. For example, various energy resource devices with which the controllers 204 communicate may be meters or relays of the electrical power grid.

Hierarchical energy management system 200 can generally be used for optimized management of energy resource devices, such as energy storage devices and power conversion devices. Specifically, the hierarchical energy management system can be configured to allocate functionality by controlling energy resources using different tiers of control or management. In particular, the hierarchical energy management system 200 can implement a resource manager to manage a set of controllers. In turn, each controller of the set of controllers can then be used to manage an aggregation of energy resource devices (e.g., energy storage units).

Resource manager 202 can be used to manage a set of controllers, such as controller 204A through 204N to effectuate control of energy resource devices. In this regard, resource manager 202 communicates with a set of controllers, which each in turn communicate with an aggregation of energy resource devices. To manage a set of controllers, the resource manager 202 may include a power engine 220, an allocation engine 222, and a scheduler engine 224.

The power engine 220 is generally configured to identify an amount of power associated with a system. In this regard, the power engine 220 can identify an amount of power for applying or using within a system (i.e. the set of resource energy devices managed by the resource manager 202). In some cases, to identify an amount of power for the system, an operating mode(s) is used. An operating mode generally indicates a mode of operation to implement in association with a particular achievement, objective, or goal. In this way, an operating mode facilitates identification of a power amount using an algorithm(s) corresponding with an operating mode to attain a particular outcome. As an example, at a high level, an operating mode can indicate a system goal such that power is maintained at a particular level (e.g., based on maintaining power at a particular point and/or meter). Each operating mode may have its own corresponding goal so that when the mode is enabled, the operating mode helps to meet the system goal.

Examples of operating modes include peak power limiting mode, forecast assurance mode, volt/watt mode, power smoothing mode, limited watts mode, power following mode, power factor correction mode, frequency correction mode, state-of-charge maintenance mode, spinning reserves mode, or the like. Peak power limiting mode generally responds to real power levels on the grid, driving the charging or discharging of an ESU(s) to transcend system bottlenecks and meet peaks in demand. Forecast assurance mode generally responds to a forecast of power use and real power levels on the grid, driving charging or discharging of an ESU(s) to avoid high-cost energy purchases. Volt/Watt mode generally responds to voltage levels on the grid, driving the charging or discharging of an ESU(s) to maintain voltage within the specified band. Power smoothing mode generally responds to real power levels on the grid, driving the charging or discharging of an ESU(s) to maintain voltage within the specified brand. Limited watts mode generally caps the real power output of an ESU(s). Power following mode generally drives the real power output of an ESU(s) in response to demand on a sub-circuit. Power factor correction mode generally drives reactive power output of an ESU(s) in response to power factor readings anywhere on the grid. Frequency correction mode generally maintains frequency within limits by charging or discharging an ESU(s). State-of-charge maintenance mode generally restores a battery(s) in an ESU(S) to a target state of charge. Spinning reserves mode generally applies frequency correction as a first priority and state-of-charge maintenance as a second priority.

In some embodiments, such operating modes can be implemented such that there is segmentation of operating modes associated with different portions of a system (e.g., energy resource devices associated with the resource manager). In this way, the resource manager 202 can control different energy resource devices at a site based on the different operating modes. For example, the power engine can identify power in association with a portion of energy resource devices using a first set of operating modes, and power in association with a second portion of energy resource devices using a second set of operating modes. In some cases, the power engine 220 can implement segmentation based on a predetermined configuration of energy resource devices and/or controllers at a site. For example, segmentation can be based on the physical layout of the site. In other cases, segmentation can be based on a virtual division of the site (e.g., allocations based on percentages of the devices in the system).

As can be appreciated, any number of operating modes can be applied and used to identify an extent of power in association with the system. Such operating modes can be selected or input by a user of user device 210. For example, a user may specify a particular operating mode to use during various time durations. In other cases, operating modes may be automatically identified based on information identified in association with energy resource devices, the electric grid, and/or the like.

As such, generally, the resource manager 202 identifies an operating mode(s) and uses the operating mode, or algorithms associated therewith, to identify an amount of power in association with the system. In some cases, the operating mode(s) and/or power amount is used by the resource manager 202 to determine power allocation, as described more fully below. Additionally or alternatively, in some cases, the operating mode(s) and/or power amount can be communicated to the controllers 204.

The allocation engine 222 is generally configured to determine allocation of power in association with energy resource devices. In particular, the allocation engine 222 can use the power identified via the power engine 220 and determine an allocation of the power to apply in association with energy resource devices. As such, the allocation engine 222 can determine how much power to issue to various energy resource devices in connection with meeting a power objective or goal. In operation, the allocation engine 222 can analyze data and determine an allocation of power for energy resource devices. Such an allocation of power can be designated based on an average of the state-of-charge between aggregations of energy resource devices (e.g., managed by a particular controller). As such, an average state-of-charge of energy storage devices or ESUs associated with each controller can be determined and used to allocate power to the energy storage devices or ESUs associated with the corresponding controller.

By way of example only, assume an average state-of-charge is determined for a first set of energy resource devices 206A-206D, and an average state-of-charge is determined for a second set of energy resource devices 206E-206H. In some cases, such an average state-of-charge may be determined via the controllers 204A and 204N, respectively, based on data collected in association with the corresponding energy resource devices. In other cases, the controllers 204A and 204N may collect data in association with the corresponding energy resource devices, and provide such data to the resource manager 202 that may determine average state-of-charges (e.g., via the allocation engine 222). Based on the determined average state-of-charge associated with the first set of energy resource devices and the second set of energy resource devices, the allocation engine 222 may determine a power allocation for both the first set and the second set of energy resource devices.

In determining power allocation, the allocation engine 222 may analyze various constraints. A constraint generally refers to a limit or threshold related to power or electricity. A constraint may be a general system constraint or a constraint particular to a specific energy resource device or type of energy resource device. An initially determined power allocation may be analyzed in accordance with a relevant constraint(s) to determine validity of the power allocation. For example, a constraint may indicate that a total power (e.g., in association with a particular energy resource device) cannot exceed a threshold power level. In this regard, the power allocation may be analyzed in light of the threshold power level constraint. As another example, a constraint may indicate a state-of-charge threshold or value range. As such, the power allocation may be analyzed in light of the state-of-charge threshold or value ranges. In the event the power allocation is invalid based on a constraint, the allocation engine 222 may modify the power allocation within the confines of the constraint.

As can be appreciated, any number of constraints can be applied and used to identify a power allocation, or validity thereof, in association with energy resource devices. Such constraints can be selected or input by a user of user device 210. For example, a user may specify a particular constraint to use during various time durations. In other cases, constraints may be automatically identified based on information identified in association with energy resource devices, the electric grid, and/or the like.

As such, generally, the allocation engine 222 identifies power allocation to apply in association with sets of energy resource devices corresponding to particular controllers. The power allocation may be specific to the controllers (or set of corresponding energy resource devices) and/or specific to the particular energy resource devices. For example, in some cases, the power allocation may be specific to a set of energy resource devices associated with a controller. In such cases, the controller may determine power allocation specific to the corresponding resource devices. In other cases, the power allocation determined at the resource manager may be specific to the energy resource devices.

In some cases, the power allocation is used by the scheduler engine 224 to determine schedules, as described more fully below. Additionally or alternatively, in some cases, the power allocations can be communicated to the controllers 204. In particular, in accordance with determining a power allocation, the resource manager 202 can transmit instructions to the set of controllers that indicate an allocation of power to apply to the aggregation of energy resource devices related to a particular controller(s) (e.g., the aggregation of energy resource devices that a controller controls). In some cases, a same instruction may be communicated to each of the controllers. For example, an allocation engine 222 may allocate a first amount of power for a first set of energy resource devices associated with a first controller and a second amount of power for a second set of energy resource devices associated with a second controller. Both power allocations may be included in an instruction communicated to both the first controller and the second controller. In other cases, a first instruction may be communicated to the first controller indicating the power allocation, and a second instruction different from the first instruction may be communicated to the second controller indicating the power allocation associated with the second set of energy resource devices.

The scheduler engine 224 is generally configured to determine a schedule for performing various load operations in association with energy resource devices. For example, a schedule may include indications as to when to charge and/or discharge an energy resource device(s). As described herein, the scheduler engine 224 can use the power allocation to identify an appropriate schedule for performing load operations. In embodiments, the scheduler engine 224 may also use pricing, resource limits, maintenance events, among other things, to optimize a schedule for performing load operations. The scheduler engine 224 can provide the schedule, or portion thereof, to the controllers 204 for implementing the schedule of performing load operations.

Controllers 204 are generally configured to control a corresponding set of energy resource devices, or portion thereof. In this regard, controllers 204 can control charging and/or discharging of various energy resource devices. To do so, each controller 204 communicates with a corresponding set of energy resource devices and resource manager 202. The controller 204 may obtain operation instructions or commands from the resource manager 202. For instance, the resource manager 202 may provide a schedule indicating when to charge and/or discharge various energy resource devices and a corresponding amount. As another example, the resource manager 202 may provide an allocation of power for use by a corresponding set of energy resource devices. In some cases, the allocation of power may be specific to the particular energy resource devices. In other cases, the allocation of power may be designated for the corresponding set of energy resource devices, and the controller 204 determines the particular power to allocate for each particular energy resource device.

Each controller 204 may include various engines, such as a power engine, an allocation engine, and a scheduler engine, as described above in association with the resource manager 202. Such a power engine, allocation engine, and/or schedule engine in association with a controller 204 can operate similarly as described above in relation to the resource manager 202. However, such engines at a controller operate in association with the corresponding set of energy resource devices with which the controller communicates. By way of example, a power amount, a power allocation, and/or power schedule may be determined by controller 204A in association with energy resource devices 206A-206D. As a specific example, a controller 204 may access a set of constraints associated with the corresponding set of energy resource devices, or portion thereof, and utilize the constraints to analyze power allocation and/or schedule. For example, constraints based on an energy resource device limitation (e.g., level of power that cannot be exceeded) may be accessed and analyzed to validate that the designated power associated with the particular device is not exceeded. Advantageously, if needed, the controller 204 may adjust or modify particular power operations and/or schedules to adapt to the particular energy resource devices being controlled by the particular controller.

As previously described, the controllers 204 can monitor data associated with the energy resource devices. In this way, the controllers can receive data from energy resource devices 206 and analyze such data and/or provide such data to the resource manager for analysis. As one example, the controllers 204 may use a control loop to measure output associated with energy resource devices (e.g., power of a meter and energy storage device) and adjust to achieve the power target at the meter.

In some implementations, controllers 204 may be configured to facilitate islanding operations. Islanding operations refer to operations related to islanding, or isolating, a portion of an electric power grid, generally referred to herein as an islanded microgrid. Generally, an islanded microgrid refers to a sub-network of an electric power grid that has been isolated from the main grid. In such cases, the controller 204 may detect an event and, based on the event, initiate an islanding mode such that the corresponding energy resource devices (e.g., ESUs) communicate with the specific islanded microgrid. An event may be any occurrence or instance for which transitioning to a microgrid is desirable. By way of example only, an event may be a power outage, loss of voltage on the grid (e.g., to a threshold amount), or the like. In implementations, in accordance with detecting an event, the controller, or other component, can form the islanded microgrid for utilization. As can be appreciated, conditions or events for triggering use of an islanded microgrid and/or conditions or configurations for forming an islanded microgrid are configurable (e.g., via a user of a user device). Enabling configuration of islanded microgrids and/or use thereof enables customization for a particular site, customer, etc.

Energy resource devices 206 can facilitate utilization of an energy resource. In this regard, the energy resource devices 206 can execute instructions received from a controller to manage the energy resource device, or portion thereof, such as storage or energy conversion associated with an ESU. For example, energy resource devices, such as ESUs can charge and/or discharge in accordance with power allocation and/or allocation scheduled received from a controller.

In some embodiments, the energy resource devices 206 can be used as part of a control loop to measure power. For instance, the energy resource devices 206 can be used to measure power at a device, a meter, and/or a reference point. In some cases, such measured power can be used by the energy resource device 206 to adjust power charge and/or discharge, for example, to align with a designated power allocation (e.g., to maintain a predefined energy resource goal for an aggregation of devices). Additionally or alternatively, such measured power can then be communicated, for instance, to the corresponding controllers. In embodiments, the controller 204 can average the power levels across an aggregation of energy resources devices. The controller 204 and/or resource manager 202 can then use this aggregation to adjust the allocation and/or apportionment of power accordingly to maintain the goal as indicated via an operating mode (e.g., a level of power that cannot be exceeded). By way of example only, to execute a control loop, a controller can measure and/or receive a measurement of a level of power at an energy resource device, as well as a measurement of a level of power at a reference point (e.g., meter). In some instances, the controller (e.g., controller 204A) can then adjust an overall level of power to the energy resource device (e.g., one of devices 206A-206D) based on these measurements of power. In other instances, the controller (e.g., controller 204A) can average measurements of power across the aggregation of devices (e.g., devices 206A-206D) and communicate this averaged state-of-charge to the resource manager 202, which can then adjust an overall level of power to the aggregation of devices (e.g., devices 206A-206D) based on the averaged state-of-charge.

As such, the energy resource devices 206 can communicate with the corresponding controller 204, for example, to provide data to the controller for analysis (e.g., an energy analysis performed by the controller 204 and/or resource manager 202). The energy resource devices 206 can also communicate with the electric power grid 208 to charge from and/or discharge to the grid. In this regard, the energy resource devices 206 can accept current from or inject current into the electric power grid 208. In this way, energy resource devices, such as ESUs may act as an AC source or load for the electric power grid 208.

As described above, in some embodiments, the energy resource devices 206 may charge from and/or discharge to an islanded microgrid, such as a sub-network of electric power grid 208. Utilization of an islanded microgrid may occur in response to an indication that the sub-network is isolated from a main grid. Upon receiving an indication (e.g., from a controller), the energy resource device may discharge to the islanded microgrid until its charging capability is depleted to a lowest acceptable level, or until another indication is received indicating that the affected microgrid is no longer isolated.

Figure 4:
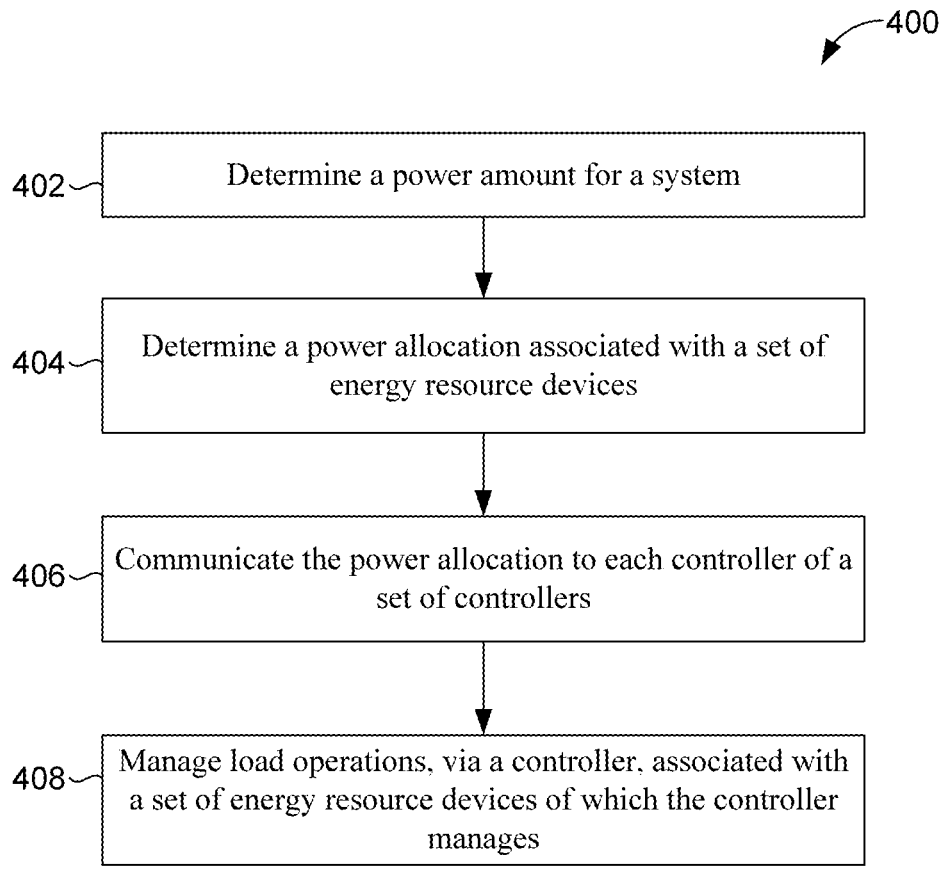
FIG. 4 depicts a process flow showing an embodiment of a method for optimized management of energy resource sites, in accordance with embodiments of the present disclosure.
Figure 5:
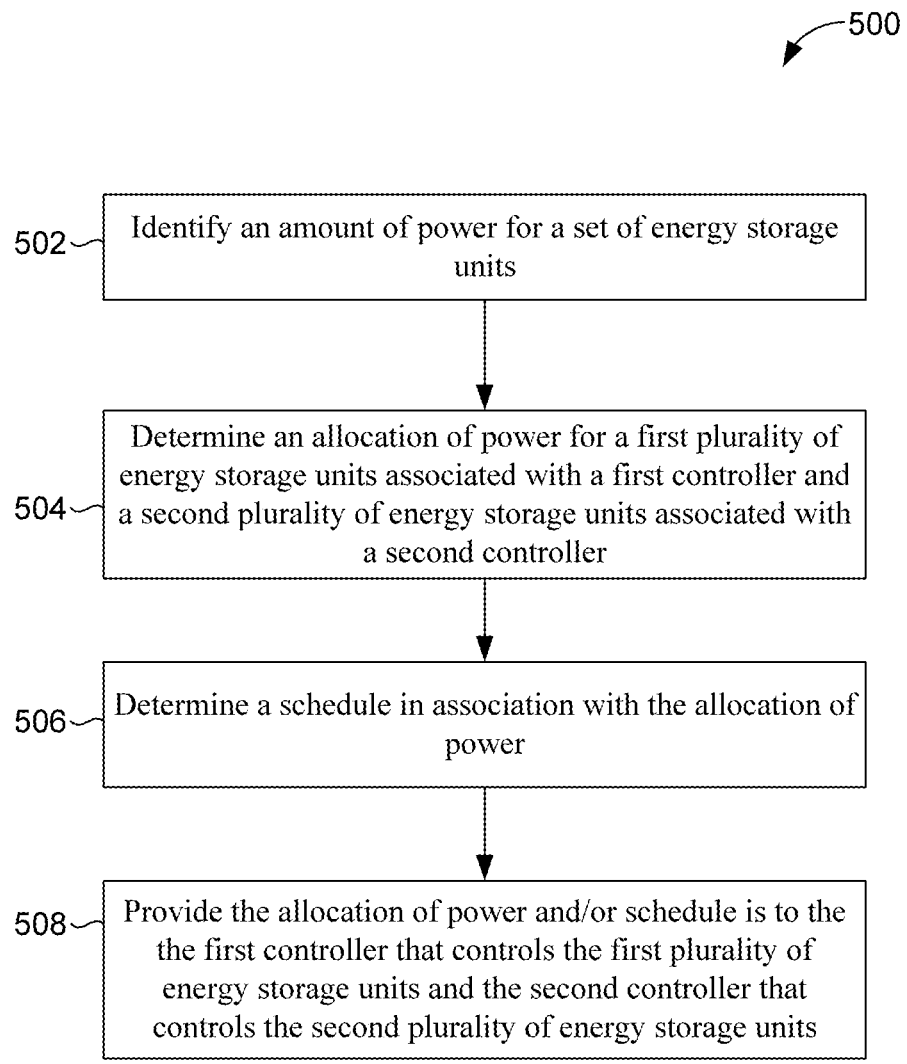
FIG. 5 depicts a process flow showing a second embodiment of a method for optimized management of energy resource sites, in accordance with embodiments of the present disclosure.
Figure 6:
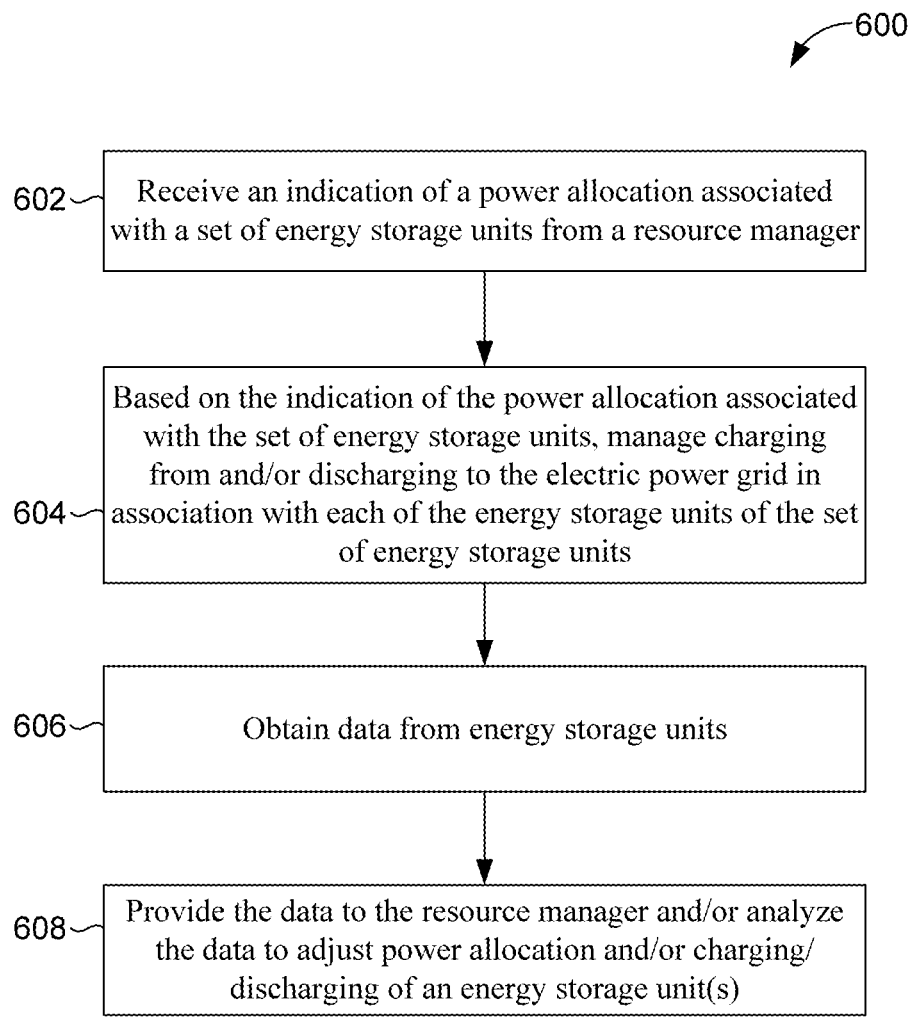
FIG. 6 depicts a process flow showing a third embodiment of a method for optimized management of energy resource sites, in accordance with embodiments of the present disclosure.

Turning now to FIGS. 4-6, FIGS. 4-6 provide exemplary methods for performing various embodiments described herein. With initial reference to FIG. 4, a process flow is provided showing an embodiment of method 400 for optimized management of energy resource sites, in accordance with embodiments of the present disclosure. Method 400 can be performed, for example by hierarchical energy management system 100 as illustrated in FIG. 1 and/or the hierarchical energy management system 200 as illustrated in FIG. 2.

Initially, at block 402, a power amount for a system is determined. In embodiments, a power amount may be determined in accordance with an operating mode(s) to be used by the system, or a portion thereof. At block, 404, a power allocation associated with a set of energy resource devices is determined. In embodiments, the power allocation is determined using metrics associated with various portions of the energy resource devices. For example, an average state-of-charge associated with a first set of energy resource devices and an average state-of-charge associated with a second set of energy resource devices can be used to determine a power allocation for the first set of energy resource devices and for the second set of energy resource devices. In some implementations, the power allocation may be used to generate a schedule used to perform load operations. At block 406, the power allocation is communicated to each controller of a set of controllers. Thereafter, at block 408, a controller, of the set of controllers, can manage load operations (e.g., charging and/or discharging) associated with a set of energy resource devices of which the controller manages. In this way, the controller can communicate with the corresponding set of energy resource devices to manage load operations and monitor data obtained from the energy resource devices. As can be appreciated, in some implementations, the controller can analyze constraints, power, etc. to adjust, modify, or distribute power allocation related to the set of energy resources devices it is managing and/or schedules associated therewith.

With reference to FIG. 5, a process flow is provided showing an embodiment of method 500 for optimized management of energy resource sites, in accordance with embodiments of the present disclosure. Method 500 can be performed, for example by hierarchical energy management system 100 as illustrated in FIG. 1 and/or the hierarchical energy management system 200 as illustrated in FIG. 2. In particular, aspects of method 500 can be performed via a resource manager, such as resource manager 102 of FIG. 1 and/or resource manager 202 of FIG. 2.

Initially, at block 502, an amount of power for a set of energy storage units is identified. Each energy storage unit can include an energy storage device and a power conversion device that interfaces with an electric power grid. In embodiments, an amount of power can be determined based on an operating mode, for example, specified by a user via a user device. At block 504, an allocation of power for a first plurality of energy storage units associated with a first controller and a second plurality of energy storage units associated with a second controller is determined. The allocation of power may be determined based on a first state-of-charge metric (e.g., average state-of-charge) associated with the first plurality of energy storage units and a second state-of-charge (e.g., average state-of-charge) associated with the second plurality of energy storage units. The allocation of power may also be determined based on a set of constraints, such as constraints provided by a user via a user device. The constraints may be used to refine or adjust an initially determined allocation of power. At block 506, a schedule is determined in association with the allocation of power. Thereafter, at block 508, the allocation of power and/or schedule is provided to the the first controller that controls the first plurality of energy storage units and the second controller that controls the second plurality of energy storage units.

With reference to FIG. 6, a process flow is provided showing an embodiment of method 600 for optimized management of energy resource sites, in accordance with embodiments of the present disclosure. Method 600 can be performed, for example by hierarchical energy management system 100 as illustrated in FIG. 1 and/or the hierarchical energy management system 200 as illustrated in FIG. 2. In particular, aspects of method 600 can be performed via a controller, such as controller 104A of FIG. 1 and/or controller 204A of FIG. 2.

Initially, at block 602, an indication of a power allocation associated with a set of energy storage units is received from a resource manager. In embodiments, each energy storage unit includes an energy storage device and a power conversion device that interfaces with an electric power grid. The power allocation may be determined based on an average state-of-charge associated with the set of energy storage units and an average state-of-charge associated with other sets of energy storage units (e.g., that are managed by other controllers). Based on the indication of the power allocation associated with the set of energy storage units, at block 604, charging from and/or discharging to the electric power grid is managed in association with each of the energy storage units of the set of energy storage units. At block 606, data is obtained from energy storage units. Thereafter, at block 608, the data is provided to the resource manager and/or analyzed to adjust power allocation and/or charging/discharging of an energy storage unit(s).

Figure 7:
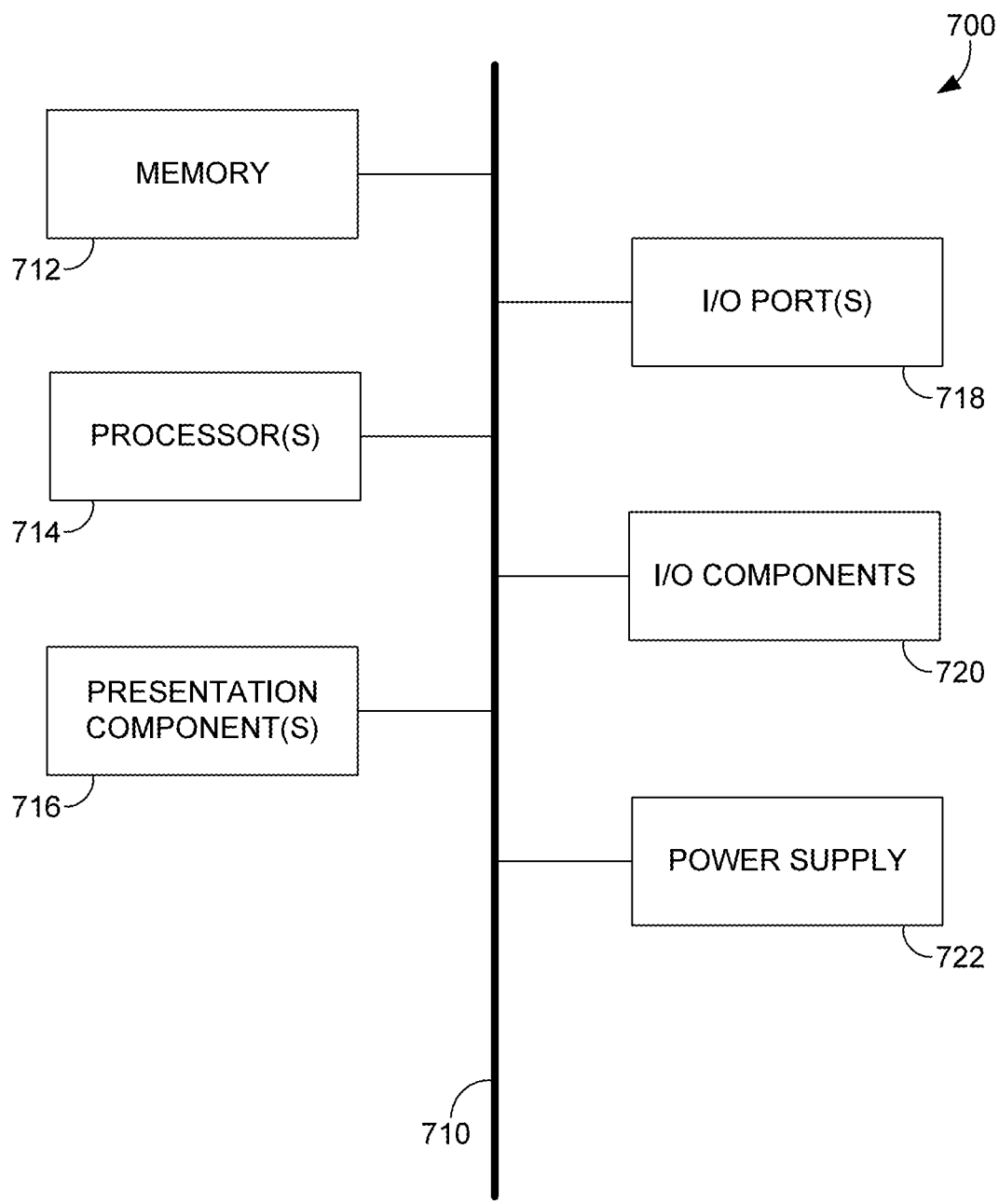
FIG. 7 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 7, an illustrative operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 800 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output ports 718, input/output components 720, and an illustrative power supply 722. Bus 710 represents what may be one or more busses (such as an address bus, data bus, or combination thereof). Although the various blocks of FIG. 7 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 7 is merely illustrative of an example computing device that can be used in connection with one or more embodiments of the present disclosure. Distinction is not made between such categories as "workstation," "server," "laptop," "hand-held device," etc., as all are contemplated within the scope of FIG. 8 and reference to "computing device."

Computing device 700 typically includes a variety of non-transitory computer-readable media. Non-transitory Computer-readable media can be any available media that can be accessed by computing device 700 and includes both volatile and nonvolatile media, removable and non-removable media. By way of example, and not limitation, non-transitory computer-readable media may comprise non-transitory computer storage media and communication media.

Non-transitory computer storage media include volatile and nonvolatile, removable and non-removable media implemented in any method or technology for storage of information such as computer-readable instructions, data structures, program modules or other data. Non-transitory computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Non-transitory computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. As depicted, memory 712 includes instructions 724. Instructions 724, when executed by processor(s) 714 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 700 includes one or more processors that read data from various entities such as memory 712 or I/O components 820. Presentation component(s) 716 present data indications to a user or other device. Illustrative presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method, the method comprising:
   identifying an amount of power for a set of energy storage units, each energy storage unit including an energy storage device and a power conversion device that interfaces with an electric power grid;
   determining an allocation of power for a first plurality of energy storage units associated with a first controller and a second plurality of energy storage units associated with a second controller, the first plurality of energy storage units located at different geographical locations from the second plurality of energy storage units, the allocation of power determined based on:
      a first tier defining a first state-of-charge metric and a first load operations schedule associated with the first plurality of energy storage units; and
      a second tier defining a second state-of-charge metric and a second load operations schedule associated with the second plurality of energy storage units; and
   providing, based on the first tier and the second tier, the allocation of power for the first plurality of energy storage units to the first controller that controls the first plurality of energy storage units and the allocation of power for the second plurality of energy storage units to the second controller that controls the second plurality of energy storage units, wherein providing the allocation of power for the first plurality of eneray storage units aid the allocation of power for the second plurality of eneray storage units causes at least a portion of the set of eneray storage units to charge and/or discharge based on the first load operations schedule implemented by the first controller and/or the second load operations schedule implemented by the second controller.

2. The method of claim 1, wherein the amount of power for the set of energy storage units is identified based on an operating mode implemented to obtain a particular objective.

3. The method of claim 1, wherein determining the allocation of power is based on one or more constraints associated with at least the portion of the set of energy storage units.

4. The method of claim 1, wherein the first state-of-charge metric comprises a first average state-of-charge of the first plurality of energy storage units, and the second state-of-charge metric comprises a second average state-of-charge of the second plurality of energy storage units.

5. The method of claim 1, further comprising:
   receiving, via the first controller and the second controller, data associated with the first plurality of energy storage units and the second plurality of energy storage units; and
   using the data associated with the first plurality of energy storage units and the second plurality of energy storage units to adjust the allocation of power for the first plurality of energy storage units and the second plurality of energy storage units.

6. The method of claim 1, wherein the first plurality of energy storage units is controlled by the first controller and the second plurality of energy storage units is controlled by the second controller based on a predetermined configuration of the set of energy storage units at an energy resource site.

7. The method of claim 1, further comprising determining a schedule for performing load operations in association with the set of energy storage units, wherein the allocation of power for the first plurality of energy storage units and the second plurality of energy storage units is provided to the first controller and the second controller in association with the schedule, wherein the load operations comprise charging and/or discharging in association with at least the portion of the set of energy storage units.

8. The method of claim 1, wherein the first tier is higher than the second tier, wherein the first tier being higher than the second tier comprises the first plurality of energy storage units having more functionality than the second plurality of energy storage units.

9. One or more computer storage media storing computer-useable instructions that, when used by one or more computing devices, cause the one or more computing devices to perform operations comprising:
receiving, from a resource manager, an indication of a power allocation associated with a first set of energy storage units located at different geographical locations from a second set of energy storage units, each energy storage unit including an energy storage device and a power conversion device that interfaces with an electric power grid, the power allocation determined based on:
a first tier defining a first average state-of-charge and a first load operations schedule associated with the first set of energy storage units; and
a second tier defining a first average state-of-charge and a second load operations schedule associated with the second set of energy storage units; and
based on the indication of the power allocation, managing charging from and/or discharging to the electric power grid in association with each energy storage unit of the first set of energy storage units and the second set of energy storage units.

10. The one or more computer storage media of claim 9, wherein managing charging from and/or discharging to the electric power grid comprises analyzing constraints associated with at least a portion of the first set of energy storage units.

11. The one or more computer storage media of claim 9, further comprising:
obtaining data associated with the first set of energy storage units; and
using the data to adjust charging and/or discharging in association with at least one energy storage unit of the first set of energy storage units.

12. The one or more computer storage media of claim 9, further comprising:
obtaining data associated with the first set of energy storage units, the data obtained from the first set of energy storage units and one or more energy resource devices; and
providing the data to the resource manager for use in analyzing the power allocation.

13. The one or more computer storage media of claim 9, further comprising adjusting the power allocation by:
identifying a first set of power levels at each energy storage unit of the first set of energy storage units;
identifying a second set of power levels at one or more reference points; and
adjusting the power allocation based on a comparison of the first set of power levels at each energy storage unit of the first set of energy storage units with the second set of power levels at the one or more reference points.

14. The one or more computer storage media of claim 9, wherein the indication of the power allocation is received in association with a schedule for performing load operations based on the first load operations schedule associated with the first set of energy storage units.

15. A hierarchical energy management computing system comprising:
a resource manager configured to determine an allocation of power for a first plurality of energy storage units associated with a first controller and a second plurality of energy storage units associated with a second controller, the allocation of power determined based on:
a first tier defining a first state-of-charge metric and a first load operations schedule associated with the first plurality of energy storage units; and
a second tier defining a second state-of-charge metric and a second load operations schedule associated with the second plurality of energy storage units;
a set of controllers, including the first controller and the second controller, managed by the resource manager, each controller managing a set of energy storage units in relation to charging from and/or discharging to an electric power grid based on the first tier and the second tier; and
the set of energy storage units, each energy storage unit including an energy storage device and a power conversion device that interfaces with the electric power grid, wherein the first plurality of energy storage units is managed by the first controller and the second plurality of energy storage units is managed by the second controller.

16. The system of claim 15, wherein the resource manager, the set of controllers, and the set of energy storage units reside at an energy resource site corresponding with the electric power grid.

17. The system of claim 15, wherein a first portion of the set of energy storages devices are managed by the first controller and a second portion of the set of energy storage devices are managed by the second controller based on a predetermined configuration of the set of energy storage devices at an energy resource site.

18. The system of claim 15, wherein each controller of the set of controllers communicates with the resource manager and a corresponding set of energy storage units.

19. The system of claim 15, wherein the first state-of-charge metric comprises a first average state-of-charge of the first plurality of energy storage units, and the second state-of-charge metric comprises a second average state-of-charge of the second plurality of energy storage units.

20. The system of claim 15, wherein each energy storage unit charges and/or discharges in accordance with a power allocation corresponding with the energy storage unit.

* * * * *

UNITED STATES PATENT AND TRADEMARK OFFICE
CERTIFICATE OF CORRECTION

| | | |
|---|---|---|
| PATENT NO. | : 12,034,302 B2 | Page 1 of 1 |
| APPLICATION NO. | : 17/671355 | |
| DATED | : July 9, 2024 | |
| INVENTOR(S) | : Nate Diamond et al. | |

It is certified that error appears in the above-identified patent and that said Letters Patent is hereby corrected as shown below:

In the Claims

Column 18, Line 24:
In the line reading "a first tier defining a f irst stat-of-charge metric and a" should read -- a first tier defining a first stat-of-charge metric and a --

Column 18, Lines 37-40:
In the line reading "allocation of power f or the first plurality of eneray storage units aid the allocation of power for the second plurality of eneray storage units causes at least a portion of the set of eneray storage units to charge" should read -- allocation of power for the first plurality of energy storage units and the allocation of power for the second plurality of energy storage units causes at least a portion of the set of energy storage units to charge --

Column 19, Line 21:
In the line reading "9. One or more computer storage med ia storing com-" should read -- 9. One or more computer storage media storing com- --

Column 19, Lines 32-33:
In the line reading "a first tier de fining af irst average state-of –charge and a f irst load operations schedule associated with the" should read -- a first tier defining a first average state-of-charge and a first load operations schedule associated with the --

Column 19, Line 42:
In the line reading "eneray storage units." should read -- energy storage units. --

Column 20, Line 20:
In the line reading "associated with a f irst controller and a second plurality" should read -- associated with a first controller and a second plurality --

Signed and Sealed this
Fifteenth Day of October, 2024

Katherine Kelly Vidal
*Director of the United States Patent and Trademark Office*